United States Patent Office 3,015,021
Patented Dec. 26, 1961

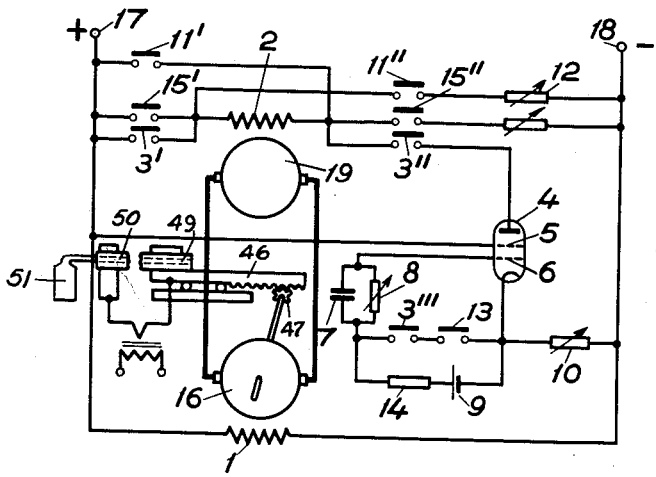
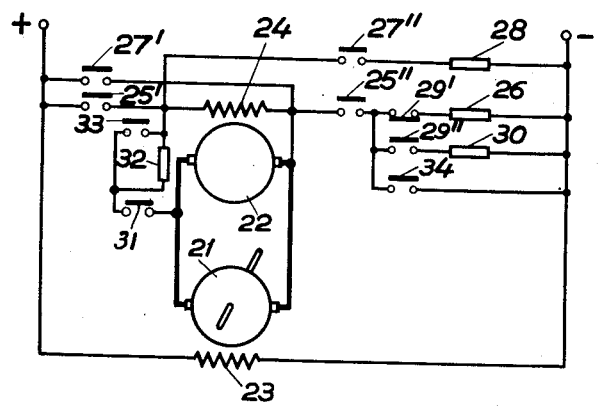
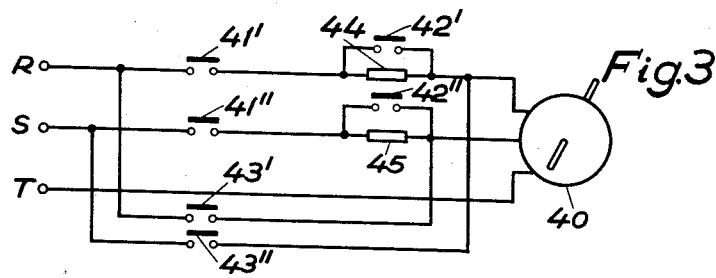

3,015,021
MEANS FOR CONTROLLING AUTOMATIC FLASH-BUTT WELDING MACHINES
Hans Wängsjö, Lidingo, and Gustav Ekberg, Stockholm, Sweden, assignors to Allmänna Svenska Elektriska Aktiebolaget, Vasteras, Sweden, a corporation of Sweden
Filed June 17, 1958, Ser. No. 742,517
Claims priority, application Sweden June 20, 1957
2 Claims. (Cl. 219—97)

The present invention refers to a means for controlling the welding process when using flash-butt welding machines. Such machines may be made according to different principles, the most important and common being based on a number of preheatings followed by flashing and upsetting. The welding heat itself is then mostly obtainend at the preheating and the main object of the flashing is to make the fusion faces smooth and clean. At the upsetting the workpieces are welded together and any remaining oxide or contamination is pressed out of the weld, At the preheating the workpieces are pressed against each other and the secondary circuit of the welding transformer is then short-circuited. After a short time the workpieces are moved away from each other in order that the heat may distribute and not concentrate at the contact points between the work-pieces. In this way overheating at the contact points is avoided. The workpieces are then pressed together again and the whole process is repeated. In order to obtain these movements easily, the moveable part of the flash-butt welding machine may consist of a platen which can be driven in any suitable way, for instance by a motor via a screw or by means of a hydraulic device.

A simple but reliable way of controlling the welding process is to connect a voltage sensitive relay in parallel with the workpieces. Owing to the relatively small impedance of the workpieces a large portion of the voltage drop during the welding will appear in the welding transformer implying that the voltage across the workpieces will be decreased from the open circuit value to about 50% of this value. If the voltage sensitive relay is chosen to have reversing voltage of about 80% of the open-circuit value, a reversal of the relay will be obtained when the workpieces are short-circuited. After a certain number of reversals, preheatings, the fusion faces have been heated so much and have been roughened so much that the number of contact points at a time, at the advance movement of the movable platen, will become considerably fewer than during the preceding preheatings. In consequence, the total current will be low and the internal voltage drop of the transnformer will become considerably lower than normal. The current density of the individual contact points will then become considerably larger so that the material will melt at these points and even evaporate. Owing to the lower internal voltage drop the relay will no longer be reversed and the movable platen will continue in the advance direction so that new contact points are continually formed and disappear.

After a certain predetermined length of the workpieces has been flashed the two workpieces are pressed together with a relatively high pressure and at a relatively high speed.

It has proved, however, that materials of certain qualities do not have the property that, during preheating, the fusion faces obtain the amount of heat and degree of roughness necessary for the flashing. This is evident in flash-butt welding tubes when a gas stream is blown through the tubes to prevent the inner upset being too large and especially when welding tubes of low alloy heat resistant steel containing chromium and molybdenum, when an inert gas, argon for instance, is blown through the tubes. When welding such workpieces the preheating will last much longer than normal and consequently the material in and around the weld will be overheated and will get impaired mechanical strength properties. This overheating cannot be eliminated by any following heat treatment.

By means of a control device according to the present invention, the above mentioned drawbacks are avoided and a good result will be obtained irrespective of the quality of the material. The main feature of the invention is that the reciprocating motion of the movable platen during the preheating is performed with a certain speed and that the advancing speed is reduced when the flashing commences and is then successively or after a predetermined time, increased to the same value as during the preheating or to a somewhat higher value.

By utilizing the invention the preheating time can be set at an empiric value so that the above mentioned risk of overheating the material is eliminated, as short welding times may be obtained even with a relatively low welding voltage.

In some cases it may be difficult to start the flashing even when using a low advancing speed. The flashing can then be facilitated if the current density in the contact points is still more increased. This may be obtained by increasing the welding voltage at the same time as the speed is reduced. As soon as the flashing has started the normal voltage may be set again, but as this is difficult to do in practice without interrupting the weld circuit, it cannot be done before flashing is over.

Some examples of the invention are illustrated on the accompanying drawing in which:

FIGURES 1 and 2 show diagrammatically a control device for a direct current motor driving a movable platen via a screw, and FIGURE 3 shows a similar arrangement utilizing a motor of the asynchronous type.

For the sake of clarity the figures only show the contacts in the current circuits and not the operating coils belonging to the contacts.

FIGURE 1 shows a Ward-Leonard system in which the field winding 1 of the driving motor 16 is directly connected to the excitation voltage at the terminals 17 and 18. The field winding 2 of the generator 19 is connected to the same voltage via a number of relay contacts. The movable platen 46 driven by the gear wheel 47 supports a tube 49. Another tube is shown at 50, this being connected to a gas supply 51. The control device, which operates according to the following principle, may be used for welding solid blanks as well as tubes, and gas may or may not be used.

When starting the welding, the relay contacts 3' and 3" are closed. The field winding 2 of the generator 19 is then energised via the thermionic tube 4, the screen grid 5 of which is connected to a voltage which is higher than the anode voltage and the control grid of which is connected via a capacitor 7 and an adjustable resistor 8, connected in parallel with the capacitor to the plus terminal of a separate voltage source 9, the other pole of which is connected to the cathode of the tube 4. When the field winding 2 is energised a voltage is supplied by the generator having such a polarity that the driving motor will advance the movable platen so that the workpieces are moved together. When the workpieces reach each other the relay contacts 3' and 3" are caused to open and simultaneously, the contacts 11' and 11" are caused to close. The field winding 2 of the generator will then be traversed by a current of opposite polarity and the generator voltage will change its polarity and the driving motor will be reversed. When the workpieces are no longer in contact with each other the relay contacts 11' and 11" are arranged to break and the contacts 3' and 3″ to close and the process will be repeated. During this preheating the output voltage of the generator and so the speed of the movable platen will be determined by the resistance values of the resistors 10 and 12.

After the preset time the relay contact 13 will close, when the contact 3‴, which operates synchronously with the contacts 3′ and 3″, also closes, the charging of the capacitor 7 ceases and it will be discharged over the resistor 8, the control grid 6 will then obtain a potential which is negative in relation to the cathode but which approaches the potential of the cathode with a speed which is determined by the time constant in the circuit which comprises the capacitor 7 and the resistor 8. In order to avoid the short-circuiting of the voltage source 9 a protective resistor 14 is connected in series.

The current in the field winding 2 will increase with the same speed as the voltage of the control grid 6 approaches the potential of the cathode and in this way the output voltage of the generator will also increase and the driving motor will be accelerated to its final speed. The flashing will start when the speed is low and will continue despite the fact that the speed increases, as the fusion faces will be sufficiently roughened as soon as the flashing starts.

When the flashing has continued to the preset length of the workpieces being burnt away, the relay contacts 3′, 3″ and 3‴ are made to open and the relay contacts 15′, 15″ to close and then the current through the generator field winding 2 will increase and the speed of the driving motor will increase and the upsetting will take place.

In FIGURE 2 a similar arrangement is shown where the speed change is obtained by making the generator self-excited for a short period. This arrangement operates in the following way:

The armature 21 of the driving motor is directly connected to the armature 22 of the generator. The field winding 23 of the driving motor is, in the same way as in FIGURE 1, connected to a source of direct current.

When the relay contacts 25′ and 25″ are made to close, the field winding 24 of the generator is energised via the relay contact 29′ and the resistor 26 and the generator will supply a voltage of such a polarity that the driving motor advances the movable platen. When the welding current circuit has been short-circuited the relay contacts 25′ and 25″ are made to open and the contacts 27′ and 27″ to close. A current will then flow through the field winding 24 via the resistor 28 in the opposite direction, so that the polarity of the generator will change and the driving motor will be reversed. The output voltage of the generator and the speed of the motor may be varied by adjusting the resistors 26 and 28 respectively.

After a certain preheating time, the contact 29′ is made to open and the contact 29″ to close and the resistor 30 will be connected in instead of the resistor 26. The resistor 30 should have a higher resistance value so that the speed of the driving motor will be lower than previously when the relay contacts 25′ and 25″ to close again. Simultaneously or after a certain time the contact 31 will close and the output voltage of the geenrator will increase in a manner determined by the resistor 32.

When flashing is finished upsetting is obtained by rapidly increasing the output voltage of the generator, for instance by short circuiting the resistor 32 by means of the contact 33 so that the self-excitation of the generator will increase. The self-excitation may also be increased by closing a contact 34 which short circuits the resistor 30.

In FIGURE 3 an arrangement is shown which is intended for use when the driving motor is a two speed asynchronous squirrel-cage motor.

When the welding starts the contacts 41′ 41″, 42′ 42″, are closed and the motor 14 will be connected to the mains by a phase sequence RST. The platen will then be moved in such a direction that the workpieces are brought into contact with each other and then the contacts 41′ 41″ are made to open and the contacts 43′ 43″ to close. The phase sequence for the motor will change to SRT and the motor will be reversed. When the workpieces no longer make contact with each other the contacts 43′ 43″ are made to break and the contacts 41′ and 41″ to close and the process will be repeated. The contacts 42′ and 42″ will still be closed.

After a preset time the contacts 42′ and 42″ are made to break and the time for breaking may be so adjusted that the contacts 42 and 42″ have remained closed for a time sufficient to accelerate the motor to a desired speed. When the contacts 42′ and 42″ break, resistors 44 and 45 are connected in circuit. The resistance values of these resistors may be so chosen that the speed of the motor will either be kept constant or be accelerated to normal speed. In the first case steps must be taken so that the relay contacts 42′ and 42″ close again after a certain time.

The invention is not limited to the forms shown and described, as modifications can be made within its scope.

We claim as our invention:

1. A process for the automatic flash-butt welding of two members, comprising reciprocating the first of said members towards and away from the second of said members during a predetermined pre-heating period, said first member reaching a certain limiting speed during each half cycle of such reciprocation, stopping the reciprocating action and reducing the advancing speed of said first member to a value below said limiting speed when flashing is to commence, maintaining a light contact pressure between the welding surfaces of said members and increasing said advancing speed to at least the value of said limiting speed during flashing, and subsequently, after a predetermined time of flashing, rapidly increasing said advancing speed to cause upsetting.

2. An improved process as claimed in claim 1, in which the welding voltage is increased when said advancing speed of said first member is reduced to a value below said limiting speed.

References Cited in the file of this patent

UNITED STATES PATENTS

| | | |
|---|---|---|
| 1,435,996 | Taylor | Nov. 21, 1922 |
| 1,522,105 | Lemp | Jan. 6, 1925 |
| 1,976,342 | Heineman | Oct. 9, 1934 |
| 1,978,891 | Blumberg et al. | Oct. 30, 1934 |
| 1,984,988 | Raupach et al. | Dec. 18, 1934 |
| 2,231,317 | Bernard | Feb. 11, 1941 |
| 2,488,899 | Cooper et al. | Mar. 22, 1949 |
| 2,770,709 | Moore et al. | Nov. 13, 1956 |
| 2,829,233 | Doutt | Apr. 1, 1958 |
| 2,877,337 | Evans | Mar. 10, 1959 |
| 2,945,940 | Schlatter | July 19, 1960 |